US008353452B2

(12) United States Patent
Sharpe et al.

(10) Patent No.: US 8,353,452 B2
(45) Date of Patent: Jan. 15, 2013

(54) VIRTUAL RETAIL ASSISTANT

(75) Inventors: Bruce Sharpe, Aurora, CO (US); James Horgan, The Woodlands, TX (US); Steven Chalmers, Parker, CO (US); Michael Miller, Denver, CO (US)

(73) Assignee: TeleTech Holdings, Inc., Englewood, CO (US)

(*) Notice: Subject to any disclaimer, the term of this patent is extended or adjusted under 35 U.S.C. 154(b) by 1275 days.

(21) Appl. No.: 11/757,102

(22) Filed: Jun. 1, 2007

(65) Prior Publication Data

US 2007/0282703 A1    Dec. 6, 2007

Related U.S. Application Data

(63) Continuation-in-part of application No. 11/538,259, filed on Oct. 3, 2006, now Pat. No. 7,658,327.

(60) Provisional application No. 60/723,352, filed on Oct. 3, 2005, provisional application No. 60/733,051, filed on Nov. 2, 2005.

(51) Int. Cl.
*G06K 5/00* (2006.01)

(52) U.S. Cl. ........................ 235/381; 235/380

(58) Field of Classification Search .................. 235/380, 235/381, 494; 379/88.11, 88.22, 88.25, 114.12, 379/114.13, 265.01
See application file for complete search history.

(56) References Cited

U.S. PATENT DOCUMENTS

| | | | | |
|---|---|---|---|---|
| 5,400,327 A * | 3/1995 | Dezonno | .................. | 379/265.02 |
| 6,732,185 B1 * | 5/2004 | Reistad | ...................... | 379/88.22 |
| 2002/0077933 A1 | 6/2002 | Dutta et al. | ...................... | 705/27 |
| 2002/0082931 A1 | 6/2002 | Siegel et al. | | |
| 2002/0120674 A1 | 8/2002 | Son et al. | ...................... | 709/202 |
| 2003/0085275 A1 | 5/2003 | Barkan | | |
| 2004/0039742 A1 | 2/2004 | Barsness et al. | ................ | 707/10 |
| 2005/0097000 A1 | 5/2005 | Freishtat et al. | ................ | 705/26 |
| 2005/0156031 A1 | 7/2005 | Goel et al. | | |
| 2005/0209868 A1 | 9/2005 | Wan et al. | ......................... | 705/1 |
| 2005/0251461 A1 * | 11/2005 | Nykamp | ........................ | 705/27 |

OTHER PUBLICATIONS

International Search Report and Written Opinion, dated Mar. 26, 2008, in International Application PCT/US06/38681.
International Search Report and Written Opinion, dated Aug. 15, 2008, in International Application PCT/US08/65110.
Edny Labbees, Office Action, Nov. 26, 2008, U.S. Appl. No. 11/533,231 Titled "Product Information Associated With Customer Location" filed Sep. 19, 2006.
Sonia L. Gay, Office Action May 25, 2010, U.S. Appl. No. 11/556,003 Titled "Shared Call Center Systems and Methods" filed Nov. 2, 2006.

* cited by examiner

*Primary Examiner* — Thien M Le
(74) *Attorney, Agent, or Firm* — Stanley J. Gradisar; Sheridan Ross P.C.

(57) ABSTRACT

Embodiments of the present invention are directed to systems and methods for facilitating communication between a customer at a retail store and a specialized agent at a remote location. The customer uses an in-store smart client kiosk to initiate a communication session with the agent. The agent can instruct the smart client kiosk to display information relevant to the customer's questions. In embodiments, the messages are XML messages transmitted between the agent's device and the smart client kiosk. The XML information contains information to retrieve content, rather than the content itself, which allows the communication to take place over a small bandwidth connection. Communication takes place in an environment that does not require co-browsing, which allows the agent to analyze large amounts of information but send only helpful information to the client.

28 Claims, 8 Drawing Sheets

VIRTUAL RETAIL ASSISTANT

RELATED APPLICATION

This application is a continuation-in-part of U.S. patent application Ser. No. 11/538,259, filed Oct. 3, 2006, and claims priority to provisional U.S. Patent Application Ser. No. 60/723,352, filed Oct. 3, 2005, provisional U.S. Patent Application Ser. No. 60/733,051, filed Nov. 2, 2005, U.S. patent application Ser. No. 11/533,231, filed Sep. 19, 2006, and U.S. patent application Ser. No. 11/556,003, filed Nov. 2, 2006, wherein the disclosure of these patent applications are incorporated herein by reference in their entirety for everything they teach.

BACKGROUND

Getting the appropriate help in a retail store is, in many cases, a frustrating experience. Store personnel are generally not trained well and are not employed for long periods of time to gain experience with the products the personnel sell. Thus, a customer is often left to find information for himself or herself either before going to a store or by scouring the information in the store. The difficulty a customer faces in finding the information necessary to make a purchase leads to a degraded shopping experience. For example, a customer who purchases a HDTV may not know that in order to view high definition images on the television she needs to buy an HDMI or DVI cable. The customer then takes the television home and realizes that she does not have the proper accessories to utilize the television's high definition capability. The customer must then make a return trip to the store to purchase an HDMI or DVI cable. The resulting poor shopping experience can reduce customer spending, create an impaired customer experience, increase customer returns, raise product dissatisfaction, and motivate customer defection.

From a customer's perspective, common issues include: 1) inability to get attention or service when he or she needs it; 2) lack of a knowledgeable sales staff regarding the products(s) the unfulfilled customer desires; 3) poor purchase decisions made without assistance from knowledgeable sales staff or objective third parties; 4) inability to locate the desired product in the store; and, 5) disconnection between the customer's online shopping experience and his or her in-store shopping experience. From the retailer's perspective, common issues include: 1) employee attrition is very high; 2) employees' sales effectiveness is constrained by limited experience; 3) employee training costs for products and services are high; 4) employee training for staff is not always effective; 5) customers are often better informed than sales staff; 6) lost opportunities for sales of complementary products and services; 7) a retailer's most valued customers are not "recognized" when they enter the store; and, 8) opportunities are lost to ensure a high quality shopping experience and repeat visits by high-valued customers.

To combat these problems, some stores have provided mechanical "kiosks" that connect the customer to a live agent. By doing so, the agent is able to guide the customer through the information on the kiosk and answer customer questions. These sessions generally involve co-browsing, i.e., the content the customer views on the kiosk is exactly the same as the content viewed by the agent, and are generally implemented using web-based frames or Flash technology. However, such implementation requires large amounts of bandwidth to transmit the co-browsing session from the agent to the kiosk. Furthermore, because the sessions are co-browsed, the agent is limited to viewing the same information as the customer, therefore preventing the agent from viewing additional helpful information, e.g., sales scripting.

SUMMARY

Embodiments of the present invention are directed to systems and methods for connecting a customer at a retail store to a specialized agent via an in-store kiosk. Communication between the in-store kiosk and the agent's terminal is facilitated using the transmission of XML messages between the devices. The XML messages do not contain content, but messages to generate content. This communication system allows the agent and customer to view different presentations of information. In this way, the agent can view larger amounts of information and only present relevant information to the client. The use of XML messages in the interaction between the customer and the agent allow communication to take place over a smaller bandwidth connection. Furthermore, content information is stored locally at both the agent location and the customer location, allowing the quick access of information on each side of the communication.

In one embodiment, the customer connects directly to the agent via the Internet. In this embodiment, the user display on the agent's desktop guides the agent's interaction with the customer by displaying a script. By way of example, the script may list helpful questions that the agent can ask the customer to aid the agent in understanding what the customer desires and to ensure a thorough collection of the customer's preferences. The agent's desktop, or a server that the agent's desktop is in electrical communication with, applies business rules to the customer's preferences to determine a listing of products that may satisfy the customer's desires. The agent pushes this information to the customer's device through simple messages from the agent's terminal to the client's device. The client's device then retrieves locally stored product information associated with the messages received from the agent, and the client device renders the information for display to the customer. The customer can then use the device to purchase the product, in which payment is made at the device and the retail store's inventory is notified to ready the product for the customer.

In another embodiment, the user interface for the client differs from the user interface for the agent. The user interface for the agent presents information to the agent that is not available to the customer. In yet another embodiment, the customer can use the smart terminal to connect to an automated agent. The automated agent can collect information from the customer and supply this information to a live agent.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present invention may be more readily described by reference to the accompanying drawings in which like numbers refer to like items and in which.

DETAILED DESCRIPTION

Embodiments of the present invention are directed to systems and methods for assisting customers in retail stores by providing the customers with information and advice from highly-trained and remotely-located retail assistants. In embodiments, a system connects an in-store customer with an agent at a call center. The call center may be located at the retail store or in a geographically separate location. The system is operable to allow the agent to provide information and/or advice to the customer. Further embodiments provide methods and data structures that allow the agent to communicate with the customer in order to answer questions and provide information.

Figure 1:
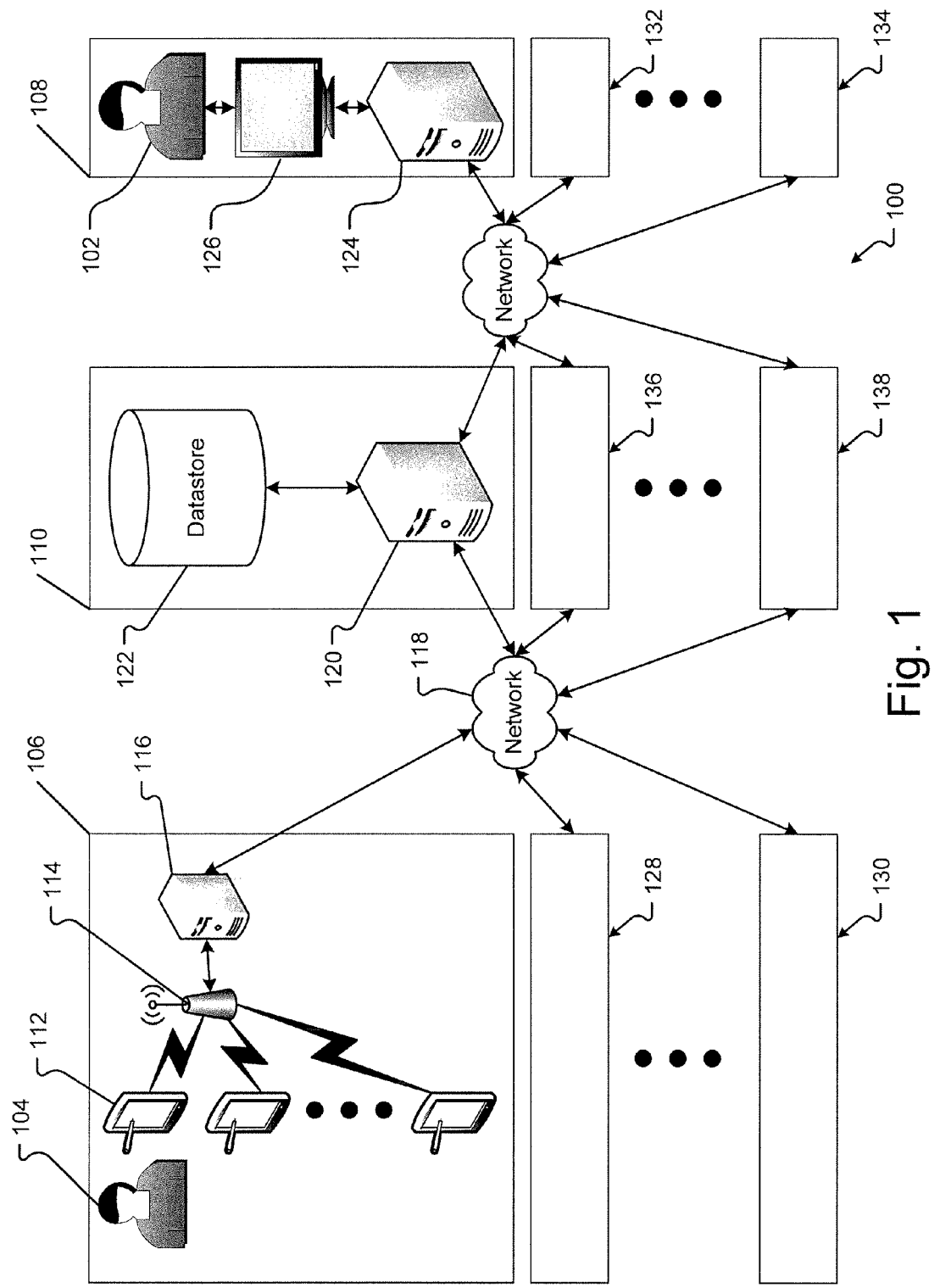
FIG. 1 is a block diagram of an embodiment of a system for displaying information to a customer in a retail store while facilitating an interaction between the customer in the retail store and an agent.

An embodiment of a system 100 for providing information from an agent 102 to a customer 104 is shown in FIG. 1. A customer 104 may be any person that interacts with the system 100 regardless of whether the customer 104 purchases a product. The system 100, in embodiments, places the customer 104 in a first retail store 106 in electrical communication with a data center 110 and then to the agent 102 at an agent location contact center 108. The retail store 106 may be any type of store that sells products or services to customers. In one embodiment, the retail store 106 is a "big box" retailer, such as BEST BUY™, that may sell one or more categories of product where each category of product includes one or more products. In the big box retailer environment, transient and temporary employees generally have difficulty learning the numerous product types, the products, and the product features. The product information may require expertise to explain.

A customer 104, in the retail store 106, who desires information about one or more products, can connect to an agent 102 who specializes in the product or the products at issue. As way of illustration, and not limitation, the agent 102 can assist the customer 104 by providing information that may include, but is not limited to, answering any questions the customer may have about the product(s), point the customer to information about the product(s), inform the customer about the product that best suits the customer's desires, inform the customer of any complementary accessories that go along with the product, help the customer purchase the product(s), and inform the retail store's inventory to ready the product for the customer. In another embodiment, the agent 102 may provide the customer 104 with product information. Product information may include information about a specific product, information about a class of products, information used in the sale of a product, a product rating, a product description, a product price, a product's features, a product's peripheral devices, or any other type of information associated with a product.

In one embodiment, the retail store 106 provides one or more customer interface devices 112, also referred to as a smart client kiosk, that are in electrical communication with a retail store server 116 through a connection 114. The smart client kiosks or customer interface devices may be any type of computing system including, but not limited to, personal digital assistants (PDAs), laptops, wireless computers, cell phones, stand-alone kiosks or computers, etc. Two or more components may be in communication in any manner or means necessary to allow the components described herein to function as described. Electrical communication comprises the communication of information or intelligence in the form of traveling stresses in an elastic medium which are detected or generated by an electric signal handling means wherein the electric signal represents the communicated information or intelligence. Further, the terms "connected" and "coupled" may be used interchangeably with the terms "in electrical communication" and do not connote a more specific type of connection or communication. In embodiments, the smart client kiosks 112 can be connected by a wired or wireless connection to a store server 116. In embodiments, the kiosk 112 is a smart client because the kiosk 112 includes a processor and local storage. The smart client kiosk's local storage may contain content information on the products available in the retail store 106. In other embodiments, the smart client kiosk can have access to a remote data storage component, e.g., a server in the store, or a web site to retrieve content information. By way of example, and not limitation, content information includes information about a product, pictures of a product, video clips about the product, customer reviews of the product, and information about the features of the product. The store sever 116 connects to a data center server 120, and the data server 120 connects to a call center server 124 through Network 118. In one embodiment, Network 118 is the Internet. In another embodiment, Network 118 may be an Enterprise Service Bus (ESB) connection. In embodiments, the ESB connection is a virtual bus used for broadcasting messages. The ESB allows devices, i.e., kiosk 112 and agent interface device 126, to publish and subscribe to events that are broadcast across the ESB. Once a device has subscribed to the ESB, it can access the ESB in order to retrieve or publish messages. In further embodiments, the ESB contains logic to identify the device or store from which a message originated. In another embodiment, the store server 116 could connect to the call center server 124 rather than the data server 120. There can be one or more retail store(s) 106, 128, and 130, in electrical communication with, one or more data center(s) 110, 136, and 138 and one or more contact center(s) 108, 132, and 134.

In one embodiment, a data center 110 provides a data server 120 and a datastore 122. In some embodiments, the data center 110 is a computer system that provides services to other computing systems over a network. In embodiments, the datastore 122 is a database stored on a hard drive, random access memory ('RAM'), read-only memory, or other storage device or system known to one of skill in the art that contains content information of the products sold by retail store 106. The data server 120 is in electrical communication with the datastore 122. In one embodiment, both the datastore 122 and smart client kiosks 112 contain the same content information. The synchronization of information is accomplished by periodically updating the local storage of the smart client kiosk 112 to match the storage of datastore 122. Data center 110 can be located within the retail store 106, within the contact center 108, within both the retail store 106 and the contact center 108, or remotely from the retail store 106 and the contact center 108. There can be one or more data center(s) 110, 136, and 138 in electrical communication with one or more retail store(s) 106, 128, and 130 and one or more contact center(s) 108, 132, and 134.

Contact center 108 includes, in embodiments, a call center sever 124, an agent interface device 126 (also referred to as an agent desktop), and an agent 102. In embodiments, the call center server 124 is a computer system that provides services to other computing systems over a network. The agent desktop 126 is a computing system that provides information to an agent during a communication with a customer. In other embodiments, the agent desktop 126 may be any type of agent interface device. By way of example, and not limitation, agent desktop 126 can be a desktop computer, a laptop computer, a tablet computer, a PDA, a server computer, a web application, or a remote terminal, or any other computing device known to the art. The agent is a trained and knowledgeable person capable of discussing products in detail. The agent desktop 126 is in electrical communication with the call center server 124. The contact center 108 can be located within the retail store 106 or remotely. There can be one or more contact center(s) 108, 132, and 134 in electrical communication with one or more retail store(s) 106, 128 and 130 and one or more data center(s) 110, 136 and 138.

When a customer 104 desires to communicate with an agent 102, the customer uses the kiosk 112 to initiate a session. In embodiments, the kiosk 112 gather's information from the customer 104 that indicates what kind of products the customer is interested in or has questions about. This information is gathered through the customer's interaction with kiosk 112. By way of example, not limitation, the customer interaction can take the form of inputting data into the kiosk using a key pad, touch screen, mouse, speech recognition device and software, access card, or any other method or means known to the art. In the present embodiment, the kiosk 112 is in electrical communication with store server 116 via a wireless connection 114. In another embodiment, the kiosk 112 can be in electrical communication with a store server 116 through a wired connection or any other type of connection. The store server 116 connects to the data server 120 and the call center server 124 via a network, such as the Internet 118. In another embodiment, the store server 116 could connect to the data server 120 and the call center server 124 through a local area network ('LAN'), wide area network ('WAN'), or any other type of network configuration.

The call center server 124 receives the customer's request to communicate with an agent 102. Depending on what type of product with which the customer wants help, the call center server 124 sends the request to a specific agent desktop 126 or establishes a connection between the specific smart client kiosk 112 and a predetermined or selected agent desktop 126. For example, if the customer's requests information about HDTV's, the contact center server will send the request to an agent who specializes in HDTV's; if the request is about cell phones, the contact center server will send the request to an agent who specializes in cell phones, etc. When an agent 102 receives the customer's request at the agent desktop 126, the agent can begin a session and initiate communication with the customer 104, wherein one embodiment of a communication session is explained in conjunction with FIG. 4.

In one embodiment, during communication with the customer 104, the agent 102 learns what features the customer desires to have in a product or what products or features the customer has questions about. For example, the customer may want a cell phone with Bluetooth wireless technology and three hours of talking time. Based upon these requirements, the agent generates a list of products that will satisfy the customer's demands. In embodiments, generation of this list can be performed at the agent desktop 126 or at the contact center server 124. After generating the list, content information regarding the products is retrieved from local storage on the agent desktop 126, if available, or from a datastore 122. In one embodiment, the agent 102 sorts through the content information and decides what information would be helpful to the customer 104. The agent 102 then sends a message from agent desktop 126 to the smart client kiosk 112. In embodiments, the message contains information associated with the product information, rather than actual content information, for the smart client kiosk 112 to facilitate the presentation of the product information to the customer 104 on the display of the smart client kiosk 112.

The smart client kiosk 112 receives the message sent from agent desktop 126 and, in embodiments, performs a data retrieval based on the message. In the present embodiment, the agent desktop 126 sends messages containing the address of the content information to the smart client kiosk 112. In an example, the address is a Uniform Resource Locator (URL) for a website or other datastore. The smart client kiosk 112 uses the address to retrieve the content information. Continuing the example from above, the message from agent desktop 126 is an instruction that instructs the smart client kiosk 112 to retrieve content information about the available phones with Bluetooth wireless technology and three hours of talking time. Using the address contained in the message, the smart client kiosk 112 retrieves the content information from its local storage, if available, or from datastore 122 if not available. The smart client kiosk 112 then displays the content information to the customer 104. In an alternative embodiment, the agent desktop 126 sends the content information to the smart client kiosk 112 rather than a message to retrieve the content information.

In the present embodiment, the smart client kiosk 112 and the agent desktop 126 display different information to their respective users. The different displays for the agent 102 and the customer 104 allows the specialized agent 102 to view a larger amount of information while the customer 104 views only the information necessary to answer his or her questions. Furthermore, the different displays allow the customer 104 to view information about different products than agent 102. Having different displays of information for the customer 104 and the agent 102 creates a more flexible system that does not involve co-browsing, which can be extremely bandwidth intensive. Embodiments of the present invention allow the agent 102 to view a larger amount of information and decide what information will be helpful to the customer 104 and filter out any unnecessary information, thus making it easier for the customer 104 to sort through product information.

Figure 2:
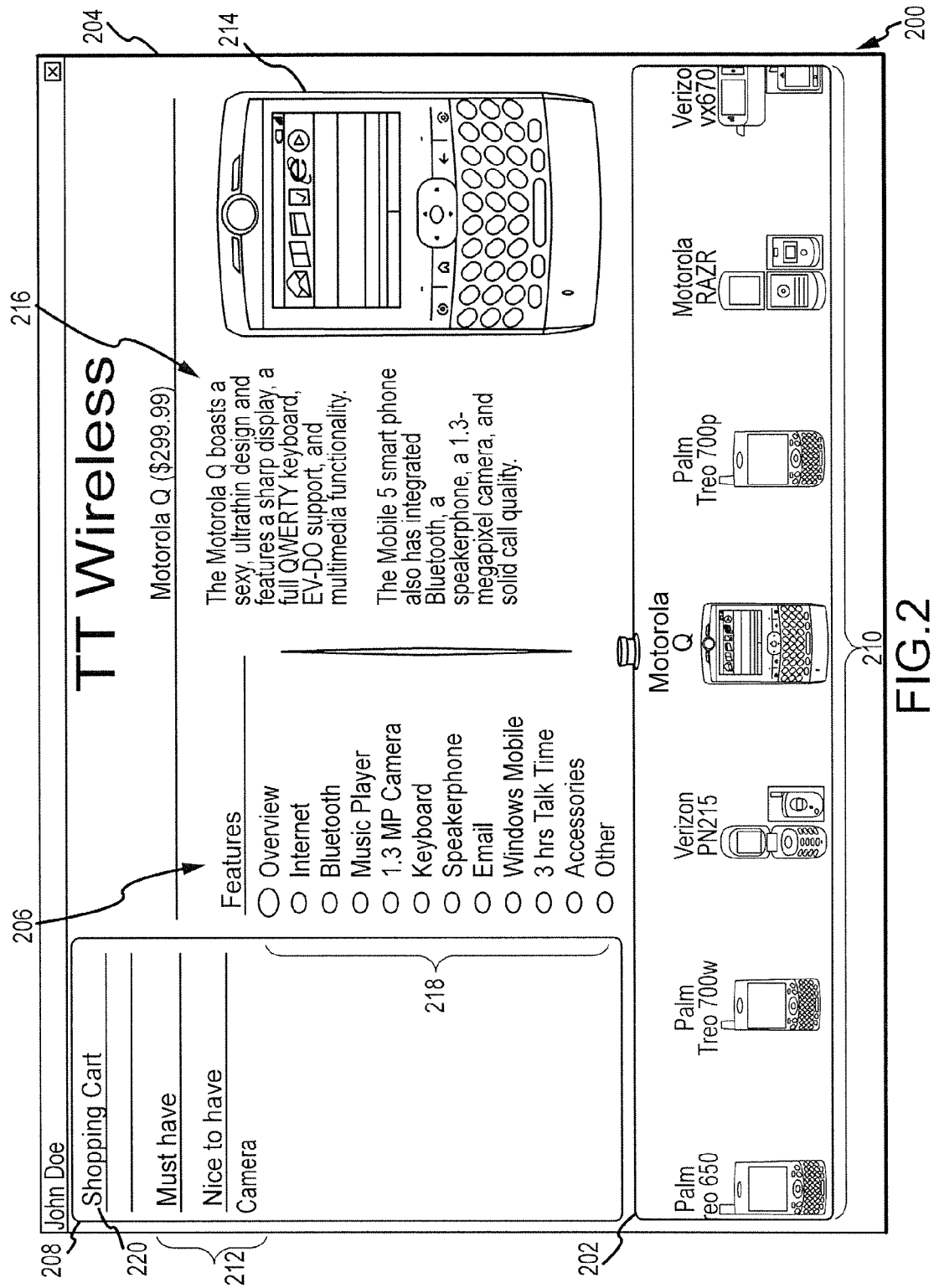
FIG. 2 is a screenshot of an embodiment of the user interface presented to the customer on a smart client kiosk.

An embodiment of a user interface 200 presented to the customer 104 (FIG. 1) on the smart client kiosk 112 (FIG. 1) is shown in FIG. 2. For ease of explanation, the user interface 200 is divided into four frames. The frames include a lower frame 202, a top right frame 204, a center frame 206, and a top left frame 208. The lower frame 202 of the user interface 200 contains pictures of one or more available products 210 that have one or more of the desired features 212 input by the customer 104. In the present embodiment, the other products 210 are represented as pictures in the lower frame 202. In an alternate embodiment, the other products 210 may be represented by text, such as a list. In embodiments, the customer 104 (FIG. 1) has the ability to browse these products 210 independent of the agent's control. In the present embodiment, the top right frame 204 includes a picture of the current product 214 selected by the customer 104 (FIG. 1) and a written description 216 of the selected product 214. In alternate embodiments, the top right frame 204 may include a video and/or audio display of the product 214, or a webpage related to the selected product 214. The center frame 206 lists the features 218 of the product 214. In one embodiment, the center frame 206 displays the desired features 212 input by the customer 104 (FIG. 1) next to an indication of which of these features are provided by the selected product 214. In an alternate embodiment, the center frame 206 may list all the features 218 of the selected product 214 or simply the features of the selected product that the customer 104 (FIG. 1) desires. Finally, the top left frame 208, in embodiments, lists the customer's desires 212 as well as the current items in the customer's shopping cart 220.

Another embodiment of the customer user interface 200, of FIG. 2, displays information about a different product, such as a HDTV, and/or displays different types of content information, such as video, audio with controls, an independent webpage, or any other type of information helpful to the customer 104 (FIG. 1). In a further embodiment, the user interface 200 can display controls in which a customer 104 (FIG. 1) can input information such as questions about a product or features desired by the customer 104 (FIG. 1). In this embodiment, the user interface would also provide the customer 104 with an option to initiate a live session with an agent 102 (FIG. 1) or an automatic session in which the customer 104 (FIG. 1) can view product information. By way of illustration, and not limitation, the customer 104 (FIG. 1) can interact with the user interface 200 using a keyboard, mouse, touch screen, speech recognition device and software, or any other method of interaction known to the art.

Figure 3:
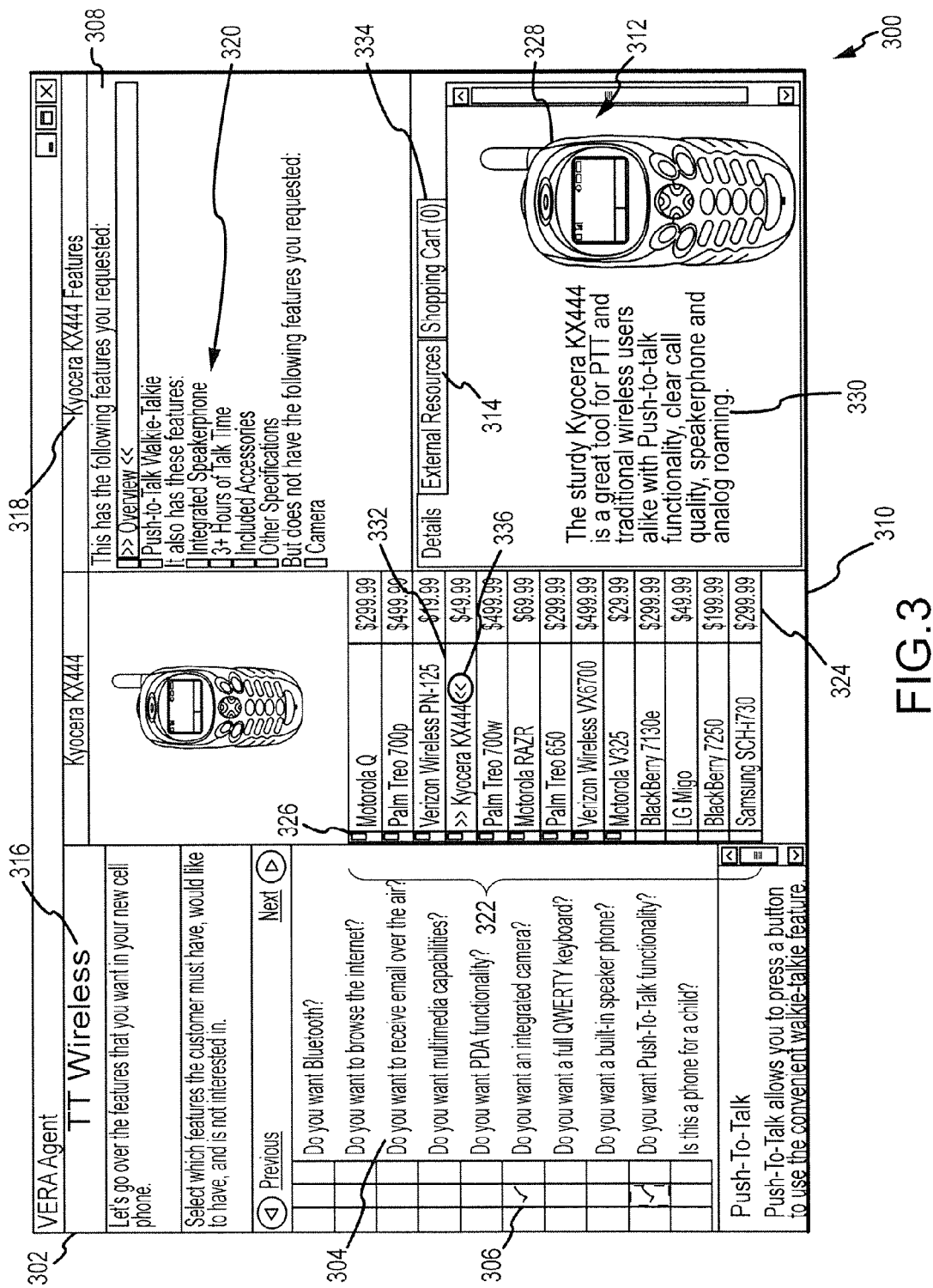
FIG. 3 is a screenshot of an embodiment of the user interface presented to the agent on an agent's desktop.

An embodiment of an agent interface 300 presented to an agent 102 (FIG. 1) on an agent desktop 126 (FIG. 1) is shown in FIG. 3. The agent interface 300 can contain less, more, and/or different information than the user interface 200 embodied in FIG. 2. The top left frame 302 of the agent interface 300 displays a retail store name or logo 316 indicating the retail store 106 (FIG. 1) at which the customer 104 is shopping and also indicates the client for which the agent 102 (FIG. 1) is working. Under the retail store logo 316, the agent interface 300 displays a script 304 used to guide the agent 102 (FIG. 1) in assisting the customer 104 (FIG. 1). The agent 102 (FIG. 1) can use the script 304 to select features 306 that interest the customer 104 (FIG. 1). The top right frame 308 of the agent interface 300 contains detailed information 320 about a product 318. In an embodiment, such information 320 may include a listing of the features the product has that the client specifically requested, other features the product contains, and the features the product lacks but the customer desires. In the present embodiment, the information 320 is displayed as pictures and text. In alternate embodiments, the information 320 can be displayed as a video, audio with controls, an independent webpage, or any other form known in the art.

The center frame 310, in embodiments, contains a list of products 322 available at retail store 106 (FIG. 1) and indications as to which products have the customer's requested features 212 (FIG. 2) and a listing of their respective prices 324. In an embodiment, an indication 326 next to one or more entries 322 can inform the agent as to how well the product 322 matches a customer's desires 212 (FIG. 2). By way of example, not limitation, the indication 326 can take the form of a symbol, a color code, highlighted, underlined, or italic text, a picture, or any other means of drawing attention to the product (this is an indication of how close a match the product is to the requirements selected in frame 306, e.g., 50% match, 75% match).

In some embodiments, the agent interface 300 displays a picture 328 of the product currently selected by the agent as well as detailed information 330 about the selected product 332 in the bottom right frame 312. The shaded background of the cells holding the name of the product 332 provide an indication of which product the agent is reviewing, it also indicates what meets or does not meet the selected feature that the customer is interested in from frame 306. In an embodiment, the bottom right frame 312 includes functionality that also allows the agent to access external resources 314 about the product which are not found in local datastore 122 (FIG. 1). By way of example, and not limitation, such external resources 314 could be links to customer or product reviews, videos, websites, or other media located on the Internet. In further embodiments, the agent interface 300 also gives an agent the ability to add the product to the customer's shopping cart 334 if the customer decides to make a purchase.

Because agent interface 300 differs from the customer user interface 200 of FIG. 2, in some embodiments, the agent receives an indication 336 of what product 332 the customer 104 (FIG. 1) is currently browsing (the same is so for the character in frame 308, to understand what feature the customer is viewing for the same product). This indication 336 gives the agent an understanding of what the customer 104 is interested in and allows the agent 102 to navigate to the same product as the customer, if so desired. In the present embodiment, the indication 336 is given by surrounding the product with chevrons. In an alternate embodiment, indication 336 could be given using a symbol, a color code, highlighted, underlined, or italic text, a picture, or any other means of drawing attention to the product 332. It should be noted that the agent and the customer may look at different products simultaneously. Thus, the agent and customer are not co-browsing but conducting two separately-controlled, but linked sessions.

In another embodiment, the agent interface 300 of FIG. 3 also displays store specific information (not shown) to agent 104 (FIG. 1). By way of example, not limitation, store specific information includes the local weather conditions of a retail store, the local news, the store's address, the phone number of the retail store, etc. The agent 102 (FIG. 1) can use such store specific information to build a rapport with the customer 104 (FIG. 1) by using the specific information to initiate a conversation with customer 104 (FIG. 1).

Figure 4:
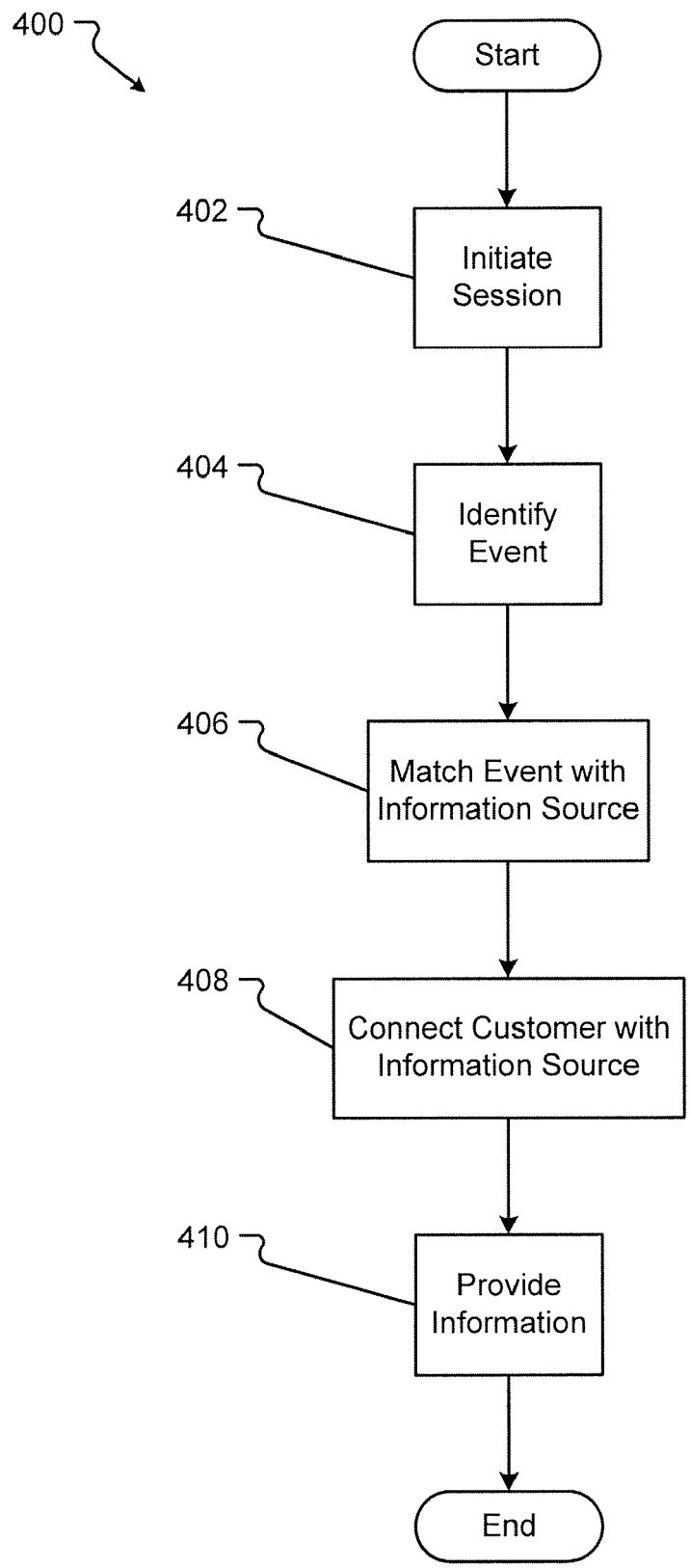
FIG. 4 is a flow diagram representing an embodiment of a method for providing information to a customer at a retail store.

A flow diagram representing an embodiment of a method 400 for providing information to a customer 104 (FIG. 1) at a retail store is embodied in FIG. 4. Initiate operation 402 initiates a session. In one embodiment, a smart client kiosk 112 (FIG. 1) initiates a session with an agent desktop 126 (FIG. 1). The session can be initiated by a customer 104 (FIG. 1) interacting with the smart client kiosk 112 (FIG. 1) by, for example, touching a button on the display of the smart client kiosk 112 (FIG. 1) that initiates the information session. In an alternative embodiment, the location of the customer 104 (FIG. 1) is tracked and if a customer 104 (FIG. 1) lingers in one area of the retail store 106 (FIG. 1), the agent desktop 126 (FIG. 1) automatically starts a session with the wireless smart client kiosk 112 (FIG. 1) being carried by the customer 104 (FIG. 1).

Identify operation 404 identifies an event. In embodiments, the type of event occurring at the smart client kiosk 112 (FIG. 1.) and/or the agent desktop 126 (FIG. 1) consists of the customer 104 (FIG. 1) transmitting desired product features to the agent desktop 126 (FIG. 1) or the customer 104 (FIG. 1)

selecting a product on the smart client kiosk 112 (FIG. 1) to learn more about the product. The identify event operation 404 may identify this event as a message sent from the smart client kiosk 112 (FIG. 1) to agent desktop 126 (FIG. 1). In other words, the smart client kiosk 112 (FIG. 1) recognizes an event and transmits a message to the agent desktop 126 (FIG. 1) for response to the event.

Match operation 406 matches the identified event with an information source. Continuing the example from above, the smart client kiosk 112 (FIG. 1) sends a message to agent desktop 126 (FIG. 1) containing information regarding the customer's desired product and/or the desired features of the product. In the present embodiment, the match operation 406 places the event in a queue, discussed later in conjunction with FIG. 5, containing messages sent between the smart client kiosk 112 (FIG. 1) and agent desktop 126 (FIG. 1). In an alternate embodiment, match event operation 406 can place the event in a different kind of queue or associate the event with actual content data.

Connect operation 408 connects the customer 104 (FIG. 1) with an information source. For example, the smart client kiosk 112 (FIG. 1) is connected to a source of information that answers the customers questions about the product as requested in the event. In embodiments, an information source can be a local datastore, a remote datastore, a message queue as described in conjunction with FIG. 5, a smart client kiosk 112 (FIG. 1), an agent desktop 126 (FIG. 2), the Internet, or any other information source known.

Provide operation 410 provides information. A smart client kiosk 112 (FIG. 1), in embodiments, may retrieve the information from a database as instructed by a message sent to the smart client kiosk 112 (FIG. 1) from the agent desktop 126 (FIG. 1). In other embodiments, the provide operation 410 can provide information from a local datastore, a remote datastore, a smart client kiosk 112 (FIG. 1), an agent desktop 126 (FIG. 1), the Internet, or any other information source known in the art.

Figure 5:
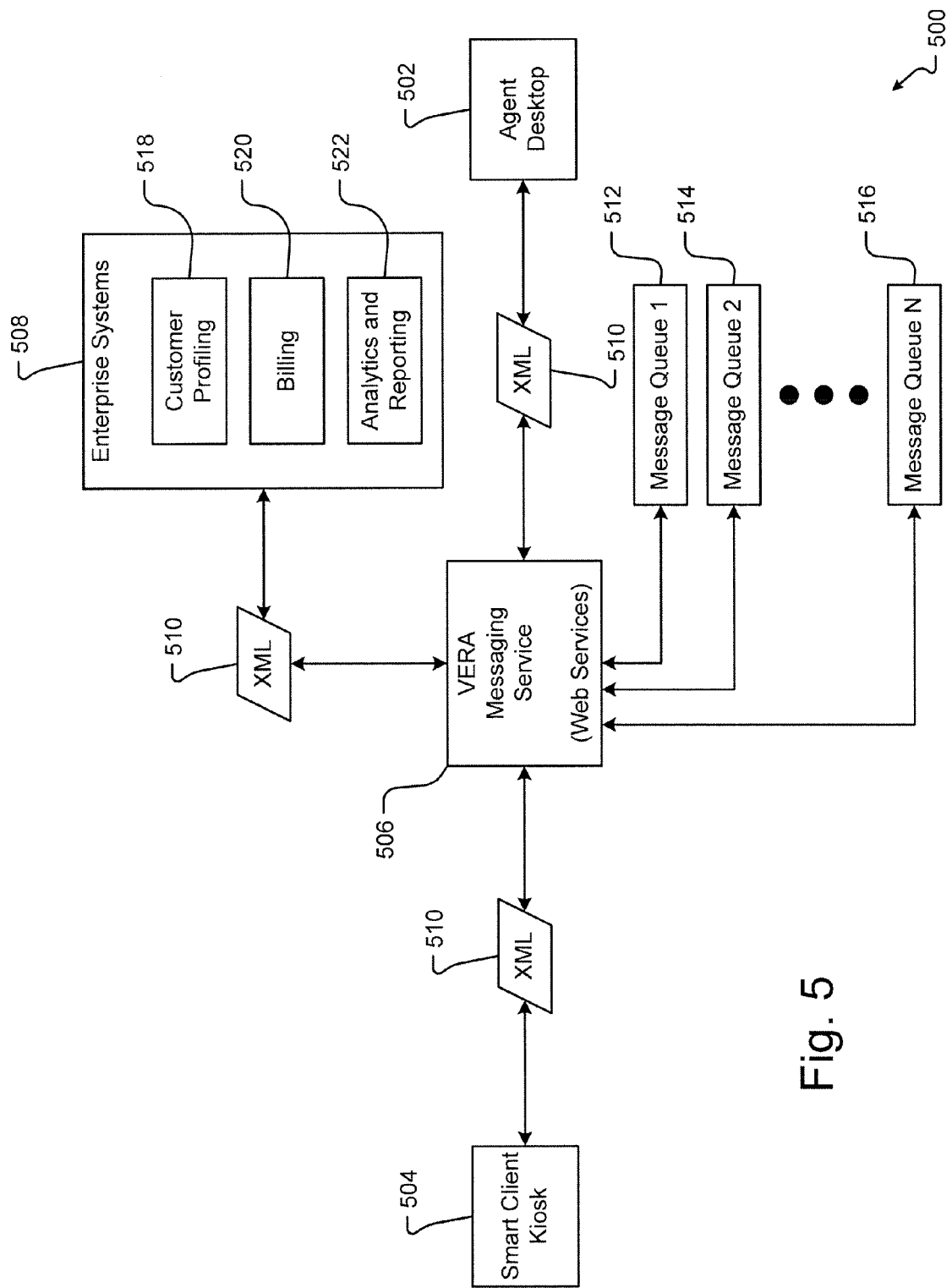
FIG. 5 is a block diagram of an embodiment of a messaging system connecting the smart client kiosk and the agent desktop.

An embodiment of a messaging system 500 for providing information from an agent desktop 502 to a smart client kiosk 504 is shown in FIG. 5. In embodiments, during a session between agent desktop 502 and smart client kiosk 504, XML messages 510 are passed between the two parties. In alternate embodiments, the messages can be in the form of SGML, HTML, XHTML, or any other type of language known to those of skill in the art. The XML messages 510 can contain instructions from the agent desktop 502 to the smart client kiosk 504 rather than content information. Alternatively, content information is passed along with the XML messages 510. The XML messages 510 are passed between the agent desktop 502 and the smart client kiosk 504 using a Virtual Retail Assistant ('VERA') Messaging Service 506. The VERA Messaging Service 506 is, in embodiments, a system for receiving messages and placing them in one or more queues 512, 514, or 516 and is described in U.S. Provisional Patent Application Ser. No. 60/723,352, filed Oct. 3, 2005, which is fully incorporated herein for all that it teaches. The VERA Messaging Service 506 receives messages between the agent desktop 502 and the smart client kiosk 504. Upon receiving the messages, the VERA Messaging Service 506 identifies the type of message and its destination. The VERA Messaging Service 506 then creates various message queues 512, 514, or 516 to hold the message until the destination device is ready to accept the message. In embodiments, the destination device, i.e. the agent desktop 502 or the smart client kiosk 504, subscribes to one or more message queue(s) 512, 514, and/or 516 and pulls the message from the queue(s) 512, 514, and/or 516 when it is ready to receive it. In another embodiment, the XML messages 510 are passed through another web service, such as SOAP, WSDL, UDDI, WS-Security, WS-Reliable-Messaging, or any other web service known to those of skill in the art. In embodiments, the VERA Messaging Service 506 also receives and queues XML messages 510 sent from the agent desktop 502 and the smart client kiosk 504 for the enterprise systems 508.

The VERA Messaging Service receives XML messages 510 from the agent desktop 502, the smart client kiosk 504, and/or the enterprise systems 508 and places them in message queues 512, 514, and 516. Message queues 512, 514, and 516 can be associated with any number of agent desktops 502, smart client kiosks 504, and enterprise systems 508. The XML messages 510 are stored in message queues 514, 512, and 516 until the queue's associated destination, i.e. agent desktop 502, smart client kiosk 504, or enterprise systems 508, is ready to receive the incoming XML message 510. By way of example, and not limitation, message queue 1 512 is associated with agent desktop 502. The VERA Messaging Service 506 places XML messages 510 from smart client kiosk 504 and/or enterprise systems 508 into message queue 1 512 until agent desktop 502 is ready to receive the XML message 510. In embodiments, when agent desktop 502 is ready to receive XML message 510, the VERA Messaging Service 506 retrieves XML message 510 from message queue 1 512 and sends it to agent desktop 502. In an alternate embodiment, agent desktop 502 retrieves the XML message 510 from message queue 1 512 without assistance form the VERA Messaging Service 506. In one embodiment, the XML message 510 is stored in and retrieved from queue 1 512 in a First In First Out (FIFO) manner. In another embodiment, XML message 510 is stored in and retrieved from message queue 1 512 in another manner, for example, by Last In First Out (LIFO), by message priority, or by any other manner known to one of skill in the art.

In embodiments, agent desktop 502, smart client kiosk 504, and enterprise systems 508 receive XML messages 510 from VERA Messaging Service 506 by subscribing to a particular queue. By way of example, not limitation, smart client kiosk 504 can send a XML message 510 to agent desktop 502. VERA Messaging Service 506 receives the XML message 510 and creates a queue, in this case the queue can be message queue 1 512. In alternate embodiments, the queue can be any other queue created by the VERA Messaging Service 506. VERA Messaging Service 506 then designates message queue 1 512 as containing messages sent from smart client kiosk 504 to agent desktop 502. Agent desktop 502 subscribes to message queue 1 512. After subscribing to message queue 1 512, agent desktop 502 periodically polls message queue 1 512 until a new message is detected. Agent desktop 502 can then retrieve XML messages 510 that are placed into message queue 1 512. In alternate embodiments, agent desktop 502, smart client kiosk 504, and enterprise systems 508 can subscribe to any message queue 512, 514, and/or 516 created by VERA Messaging Service 506. Any one session between the smart client kiosk 504 and an agent desktop 502 may have one or more message queues 512, 514, and/or 516 that are used during the session.

Enterprise systems 508 include components for customer profiling 518, billing 520, and analytics and reporting 522. The customer profiling component 518 stores customer information related to customer 104 (FIG. 1) using smart client kiosk 504. By way of example, and not limitation, customer information can include information such as the customer's name, contact information, billing information, recent purchases, etc. Customer 104 can be identified by a unique login, an access card, and/or RFID location as described in U.S.

patent application Ser. No. 11/533,231, filed Sep. 19, 2006, which is fully incorporated herein for all that it teaches. Other methods for identifying the customer 104 (FIG. 1) may be uses-used as is known to those of skill in the art. Billing component 520 stores billing information. By way of example, not limitation, billing information can include the customer's name and billing address, purchase method (i.e. cash, check, credit card, or debit card), product price, sales tax, etc. The analytics and reporting component 522 contains information related to the retail store 106 (FIG. 1). By way of example, and not limitation, the retail store information can include total sales, gross revenue, inventory, etc. In embodiments, these enterprise components 508 can subscribe to message queues 512, 514, and/or 516 created by VERA Messaging Service 506 to receive or retrieve XML messages 510 and can also send XML messages 510 to agent desktop 502 or smart client kiosk 504 via the VERA Messaging Services 506.

In embodiments, enterprise systems 508 subscribes to message queues 512, 514, and/or 516 created by VERA Messaging System 506. Enterprise systems 508 retrieves XML messages 510 from these queues and stores customer information in the customer profiling component 518, billing information in the billing component 520, and analytics and reporting information in the analytics and reporting component 522. In other words, the enterprise system 508 sniffs all queues used during a session between the smart client kiosk 504 and the agent desktop 502. Any pertinent message, e.g. a purchase or request for product information, can be copied into and stored in an information database by one of the enterprise system components 518, 520, and/or 522. The contact center or retailer may use the recorded information for improving the effectiveness of the sales staff or the quality of the shopping experience. At any time, agent desktop 502 or smart client kiosk 504 can request this information from enterprise systems 508. Enterprise systems 508 responds to the request by retrieving the proper information from one of its components, and sending the information to the requesting device via an XML message 510. In an alternate embodiment, the messages can be in the form of SGML, HTML, XHTML, or any other type of language known to those of skill in the art.

A system 600 for providing information from an agent desktop 602 to a customer device 604 is embodied in FIG. 5. In this embodiment, customer device 604 communicates directly with agent desktop 602 through web services 608 and 618, and/or through automation components 622. When communicating directly through web services 608 and 618, agent desktop 602 and customer device 604 may use the procedures and systems described above in conjunction with FIG. 5. Customer device 604 is located in the local retail store, for example, retail store 106 (FIG. 1), and can be a device such as a smart client kiosk 112 (FIG. 1) or any other type of smart device. However, the customer device is not integrated with the store appliances 650, which include communication and data storage components, as is shown with dotted line 642. Agent desktop 602 is located at a data center 648 separate from the local retail store as is illustrated with dotted line 644. The embodiment further incorporates an event queue 646, which tracks events taking place between customer device 604 and agent desktop 602. By way of example, not limitation, such events include instructions, content, and/or messages sent between the agent desktop 602 and the customer device 604. In alternate embodiments, the agent can be located within the retail store 106 (FIG. 1) or elsewhere.

In embodiments, the web server 608 is in electrical communication with customer device 604, with the event log 610, with the event queue 614, and/or with web services 618. In embodiments, the web server 608 can be the VERA Messaging Sever 506 (FIG. 5) or any other type of server that facilitates electrical communication known to the art. Event log 610 keeps track of all of the events generated between customer device 604 and agent desktop 602 for retail store 106 (FIG. 1). Event Log 610 can be in electrical communication with an agent session manager 612. The agent session manager 612 tracks the events taking place between the agent desktop 602 and customer device 604. Tracking the events allows a store manager to view the events taking place between the customer 104 (FIG. 1) and the agent 102 (FIG. 1) and ensure that agent 102 (FIG. 1) provides proper and useful service to the customer 104 (FIG. 1) and to evaluate the effectiveness of agent 102 (FIG. 1).

Event queue 614 is also in electrical communication with the manager device 616. The in-store manager of the retail store 106 (FIG. 1) uses the manager device 616 to track events between customer device 604 and agent device 602. By way of example, not limitation, the in-store manager can use manager device 616 to monitor the effectiveness of communication between customer 104 (FIG. 1) and agent 102 (FIG. 1) in real time, track the number of sales made on customer device 604, and determine which products in retail store 106 (FIG. 1) are generating the most customer traffic and, in response, send more in-store employees to the appropriate department to assist customers. The manager may also receive information at the manager device 616 that requires his or her attention. For example, customer dissatisfaction with an agent could be addressed immediately.

In alternate embodiments, the customer device 604 can connect to agent desktop 602 through the automation components 622. Automation components 622 include a GiGaPOP Automatic Call Distribution/Intelligent Voice Recognition ('ACD/IVR') system 624, Computer Telephony Integration (CTI) 626, and an application server 628, abbreviated to App. Svr. 628. GiGaPOP ACD/IVR 624 is described in U.S. Utility patent application Ser. No. 11/556,003, filed Nov. 2, 2006, which is fully incorporated herein for all that it teaches. GiGaPOP ACD/IVR 624 provides an Intelligent (interactive) Voice Response ('IVR') in which customer 104 (FIG. 1) can communicate, using verbal response, with an automated phone agent via the customer device 604. Additionally, the GiGaPOP ACD/IVR 624 provides Automatic Call Distribution ('ACD') to transfer, from the automated agent, and connect a phone call between the customer 104 to a live agent 102 (FIG. 1). The GiGaPOP ACD/IVR 624 facilitates the transfer of all information automatically corrected from the customer, using the IVR 624 or CTI 626, to the live agent.

Automation components 622 also include a Computer Telephony Integration ('CTI') 626. The CTI 626 can collect non-verbal information from the customer 104 (FIG. 1) using the customer device 604. For example, if the phone system asks the customer to dial '2' to talk to a live agent. Finally, in embodiments, automation components 622 contain an application server 628. The application server 628 processes information collected from the customer 104 (FIG. 1) by the suite of automation components 622 and the agent 102 (FIG. 1) at the agent desktop 602. By way of example, not limitation, processing executed by the application server includes applying business judgment rules to customer requests to generate a list of products that would satisfy customer 104 (FIG. 1). In another embodiment, the agent desktop 602 can perform this processing separately or in conjunction with application server 628.

Automation components 622 can also be in electrical communication with a datastore 632. In embodiments, the datastore 632 can contain product knowledge 630. By way of example, not limitation, product knowledge 630 includes information about the various products offered for sale at retail store 106 (FIG. 1) such as product features and information specific to the different features. Product knowledge 630 is transmitted to the agent desktop 602 for evaluation by an agent 102 (FIG. 1). The agent 102 (FIG. 1) determines what information is useful to customer 104 (FIG. 1) and sends the associated XML message(s) 510 (FIG. 5) to the customer device 604 via web services 618 and 608.

In embodiments, upon receipt of the XML message(s) 510 (FIG. 5) from the agent desktop 602, the customer device 604 retrieves content information from a content cache 606. The content cache 606 provides content information to the customer device 604, which in turn renders the content information for display to customer 104 (FIG. 1). In alternative embodiments, the customer device 604 periodically downloads new or altered content from the content cache 606 and stores the content in the customer device 604 or locally. Thus, the customer device 604 is perpetually updated with the latest product content.

Content cache 606, in embodiments, receives content information from a commerce server 634. The commerce server 634 can be located at an independent product manufacturer or at an agent call center. In addition, the commerce server 634 can contain one or more of the following components: a profile manager 636, a content manager 638, and/or a commerce component 640. The profile manager 636 can contain customer profile information, which it receives from and transmits to the customer device 604. In embodiments, customer profile information includes the customer's name, address, phone number, other biographical data, the customer's previous purchases, the customer's credit card numbers, etc. The content manager 638 contains content information which it transmits to the content cache 606. The content cache 606 can be updated by content manager 638 periodically, as changes occur, or by any other method known to one of skill in the art. The commerce component 640 contains information about the retail store 106 (FIG. 1).

In embodiments, if the commerce server 634 is located at a product manufacturer, the commerce component 640 can keep track of the amount of sales of the product made by the retail store. This sales tracking allows the product manufacturer to evaluate how well its products are selling and to know when to ship more inventory to the retail store. In embodiments, the commerce server 634 can store information for the profile manager 636, content manager 638, and commerce server 640 in a single or in separate datastores. The commerce server 634 can collect information for these datastores from the customer device 604 via electrical communication. In embodiments, this information can be sent from the commerce server 634 to the customer device 604 or from the customer device 604 to the commerce server 634 using XML messages, SGML, HTML, XHTML, or any other type of language known to those of skill in the art.

Figure 7:
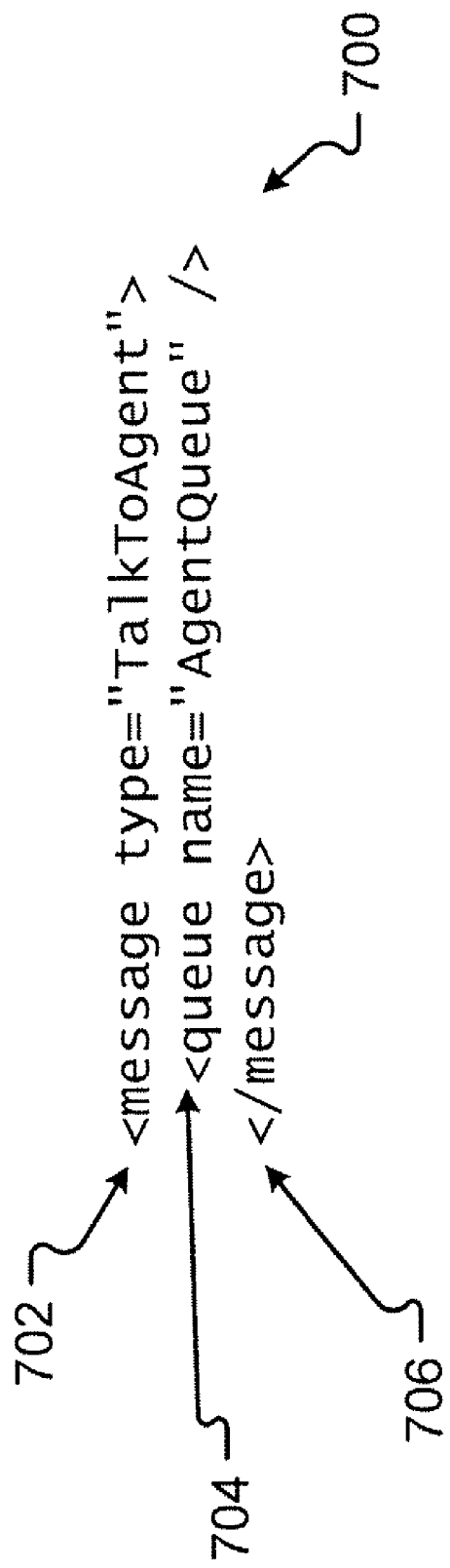
FIG. 7 is an embodiment of a data structure for a message used in communication between a smart client kiosk and an agent desktop.

An exemplary XML message 700 is shown in FIG. 7. The XML messages, in embodiments, contain messages from the agent desktop 502 (FIG. 5) to the smart client kiosk 504 (FIG. 5), requests from the smart client kiosk 504 (FIG. 5) to the agent desktop 502 (FIG. 5), or other communication described or part of the embodiments of the present invention. In embodiments, the XML messages can contain several attributes. By way of example, not limitation, attributes can include Message Type 702, which identifies the type of message being sent, Queue Name 704, which identifies which queue the message should be placed in, Message Priority (not shown), which can be used to prioritize the message within the queue, and Expiration (not shown), which specifies a duration before the message expires and should be discarded. In embodiments, the XML message 700 can also contain a message body 706. By way of example, not limitation, the message body 706 can include parameters such as agent session id, kiosk session id, skills required, customer name, address for content location, etc. In embodiments, the use of XML message 700 allows communication between agent desktop 502 (FIG. 5) and smart client kiosk 504 (FIG. 5) over small bandwidth connections because the content need not be transferred between the smart client kiosk 504 (FIG. 5) and the agent desktop 502 (FIG. 5). In embodiments, the reduction in bandwidth usage is accomplished by sending messages between the agent desktop 602 and smart client kiosk 504 as described above with reference to FIG. 1.

For example, the XML message 700 can include a message type 702 "RetrieveContent," which requires the smart client kiosk 504 (FIG. 5) to retrieve content from a location for display on the smart client kiosk 504 (FIG. 5). The XML message 700 is placed in a queue identified by the queue name 704 "Session3445." The smart client kiosk 504 (FIG. 5) involved in session number 3445 periodically polls the queue labeled or identified as queue 3445. When message 700 arrives, the smart client kiosk 504 (FIG. 5) retrieves the message, and recognizes that the message is an instruction to upload content as identified by the associated message type "RetrieveContent." The body of the message 706 includes an IP address that the smart client kiosk 504 (FIG. 5) contacts to retrieve the content. In an embodiment, the IP address identifies a local storage area in the memory of the smart client kiosk 504 (FIG. 5). The smart client kiosk 504 (FIG. 5) connects with the IP address, retrieves the web page or web frame and renders the content on the display of the smart client kiosk 504 (FIG. 5).

Figure 8:
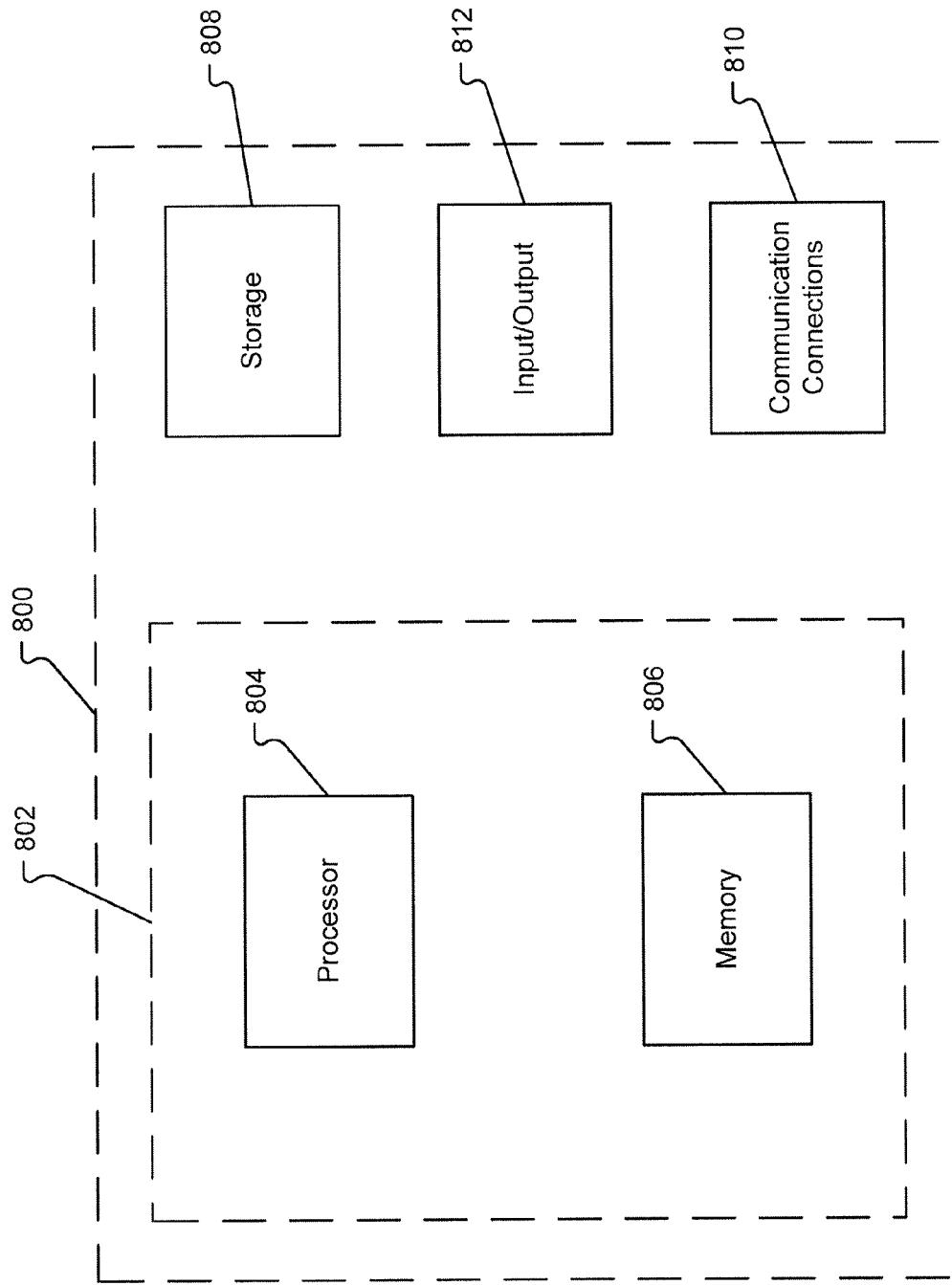
FIG. 8 is a functional diagram illustrating a computer environment and computer system operable to provide information to a customer in a retail store.

With reference to FIG. 8, an embodiment of a computing environment for implementing the various embodiments described herein include a computer system, such as computer system 800. Any and all components of the described embodiments may execute as or on a client computer system, a server computer system, a combination of client and server computer systems, a handheld device, and other possible computing environments which include the smart client kiosk 504 (FIG. 5), agent desktop 502 (FIG. 5), and the other systems described herein. As such, a basic computer system applicable to all these environments is described hereinafter.

In its most basic configuration, computer system 800 comprises at least one processing unit or processor 804 and system memory 806. The most basic configuration of the computer system 800 is illustrated in FIG. 8 by dashed line 802. In embodiments, one or more components of the described system are loaded into memory 806 and executed by the processing unit 804 from system memory 806. Depending on the exact configuration and type of computer system 800, memory 806 may be volatile (such as RAM), non-volatile (such as ROM, flash memory, etc.), or some combination of the two.

Figure 6:
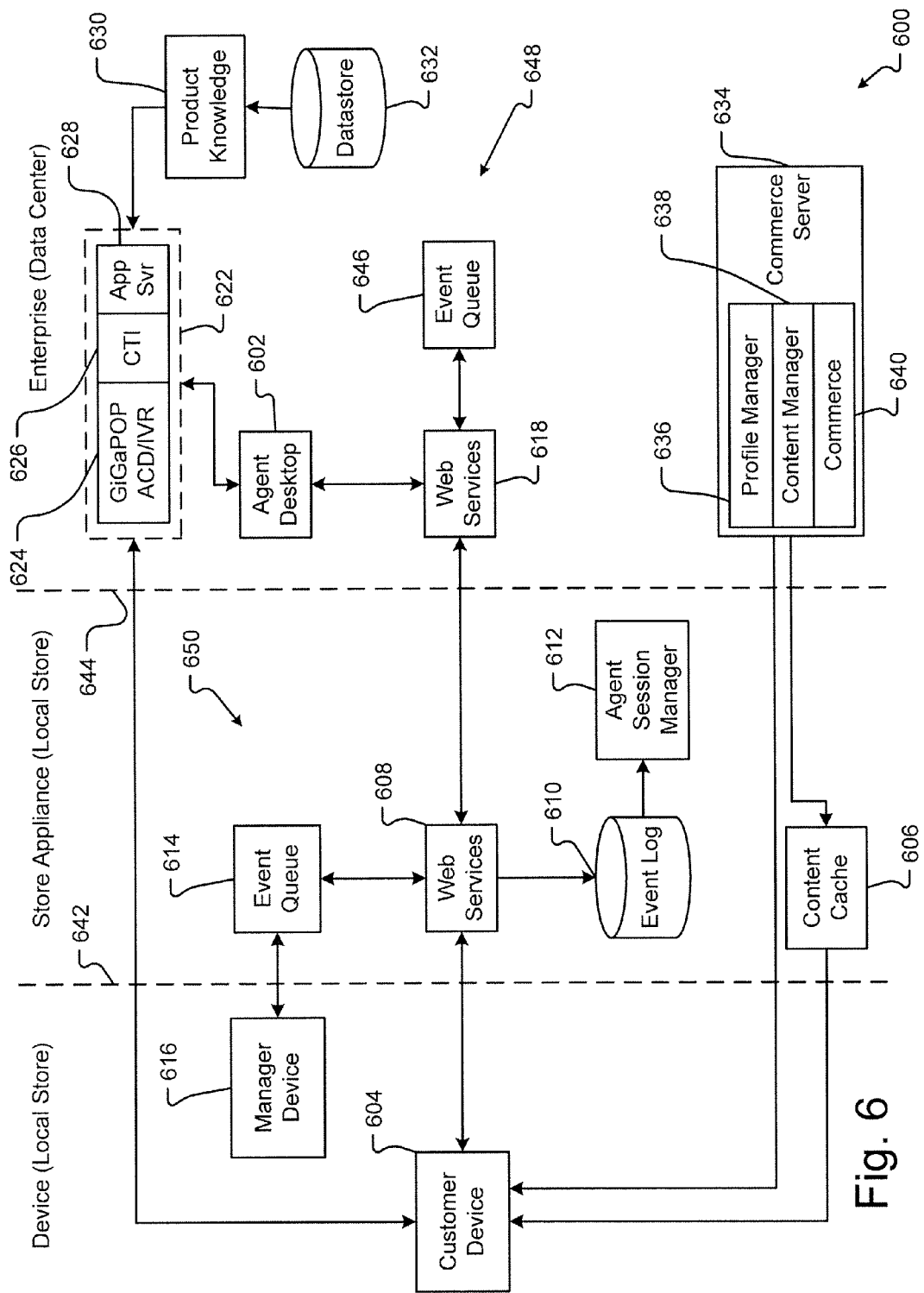
FIG. 6 is a block diagram of yet another embodiment of a messaging system for displaying information to a customer device from an agent desktop.

Additionally, computing device 800 may also have additional features/functionality. For example, computing device 800 includes additional storage 808, such as removable and/or non-removable storage, including, but not limited to, magnetic or optical disks or tape. In embodiments, software or executable code and any data used for the described system is permanently stored in storage 808. Computer storage media 808 includes volatile and non-removable volatile, removable and non-removable media implemented in any method or technology for storage of information such as computer readable messages, data structures, program modules, or other data. By way of example, not limitation, some computing devices used in the present embodiment include the agent desktop 602 (FIG. 6), the customer device 604 (FIG. 6), automation components 622 (FIG. 6), manager device 616 (FIG. 6), datastore 632 (FIG. 6), and commerce server 634 (FIG. 6).

Memory 806 and storage 808 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, or any other medium which is used to store the desired information, such as VERA component or data, and which is accessed by computing device 800 and processor 804. Any such computer storage media may be part of computing device 800. In preferred embodiments, smart client kiosk 112 (FIG. 1) would include such computer storage media. Also, in preferred embodiments, datastore 632 (FIG. 6) is also one of such computer storage media.

Computing device 800 may also contain communications connection(s) 810 that allow the device to communicate with other devices. In embodiments, the communication connection(s) 810 are used to connect customer with information over the described systems and networks, such as the Internet, that receives customer requests or events, and that sends XML messages 510 (FIG. 5) and/or information back to the wireless or wired kiosk used by the customer. Communication connection(s) 810 is an example of communication media. Communication media may embody a modulated data signal, such as a carrier wave or other transport mechanism and includes any information delivery media, which may embody computer readable messages, data structures, program modules, or other data in a modulated data signal. The term "modulated data signal" means a signal that has one or more of its characteristics set or changed in such a manner as to encode information or a message in the data signal. By way of example, and not limitation, communication media includes wired media such as a wired network or direct-wired connection, and wireless media such as an acoustic, RF, infrared, and other wireless media. In a preferred embodiment, agent desktop 602 (FIG. 6), the smart client kiosk 604 (FIG. 6), automation components 622 (FIG. 6), manager device 616 (FIG. 6), datastore 632 (FIG. 6), commerce server 634 (FIG. 6), and any other device that is in electrical communication with another device would include communication connection(s) 810.

In embodiments, computing device 800 also includes input and output connections, interfaces and peripheral devices 812, such as a graphical user interface. Requests from customers are selected with user input device(s) 812, and the information returned is displayed with output device(s) 812. The agents also utilize input device(s) 812 and output device(s) 812 when interacting with customers. Input device(s) 812 are also referred to as user interface selection devices and include, but are not limited to, a keyboard, a mouse, a pen, a voice input device, a touch input device, etc. Output device(s) 812 are also referred to as displays and include, but are not limited to, cathode ray tube displays, plasma screen displays, liquid crystal screen displays, speakers, printers, etc. These devices, either individually or in combination, form the Input/Output 812 used to display the information as described herein. All these devices are well known in the art and need not be discussed at length here. In preferred embodiments, agent desktop 602 (FIG. 6), customer device 604 (FIG. 6), manager device 616 (FIG. 6), and any other device operated by humans would include some type of these input and output connections.

Computer system 800 may also include at least some form of computer readable media, which is some form of computer readable medium. Computer readable media can be any available media that can be accessed by processing unit 804. By way of example, and not limitation, computer readable media comprise computer storage media and communication media. The described components comprise such modules or messages executable by computer system 800 that may be stored on computer storage medium and other tangible mediums and transmitted in communication media. Computer storage media includes volatile and non-volatile, removable and non-removable media implemented in any method or technology for storage of information such as computer readable messages, data structures, program modules, or other data. Combinations of any of the above should also be included within the scope of computer readable media. In some embodiments, computer system 800 is part of a network that stores data in remote storage media for use by the computing system 800. In embodiments, the described components executing on a client system may receive data from or store data to remote databases.

An illustration of an embodiment of the method and system at work will aid in fully understanding the invention. A customer 104 (FIG. 1) walks into a retail store 106 (FIG. 1), BEST BUY™, looking to buy a new cell phone. The customer 104 (FIG. 1) does not know a lot about cell phones, but she does know she wants a phone with Bluetooth wireless technology and that she needs a phone with at least three hours of talk time. Unable to receive help from the in-store employees, due to a lack of personnel or a lack of expertise in the workforce, the customer 104 (FIG. 1) uses a smart client kiosk 112 (FIG. 1) to indicate that she needs help with cell phones and initiates a session with a live agent. The customer 104 (FIG. 1) interacts with the smart client kiosk 112 (FIG. 1) using a graphical user interface 200, embodied in FIG. 2 by touching a "button" on a touch screen that states "Push here for help."

The smart client kiosk 112 (FIG. 1) sends an XML message to a web service provider, such as the VERA Messaging Service 506 (FIG. 5), indicating that a new session regarding cell phones needs to be established. The VERA Messaging Service 506 (FIG. 5) recognizes the message is of the type "NewSession" from the message type 702 (FIG. 7), and further recognizes that the customer needs help regarding cell phones. This indication could be made by including cell phones in the message type 702 (FIG. 7), queue name 704 (FIG. 7), or any other recognizable field. The message may also include a unique session id, for example "session ID: 3252." The VERA Messaging Service 506 (FIG. 5) then places the message in a queue of messages for new cell phone help sessions. By way of example, the queue name can be "Cell Phone Help." Agents 102 (FIG. 1) with expertise in cell phones subscribe to the Cell Phone Help queue and monitor the queue for new sessions. When the message reaches the top of the Cell Phone Help queue, it is passed to the next available agent 102 (FIG. 1) who subscribes to the queue. The VERA Messaging Service may also create a new queue based upon the session ID, for example, queue name "Session3252." The smart client kiosk 112 (FIG. 1) then subscribes to queue "Session3252" and waits for a message response.

Once the agent 102 (FIG. 1), at agent desktop 126 (FIG. 1), receives the initiate session message, she interacts with the agent interface 300 embodied in FIG. 3 to send a message to the smart client kiosk 112 (FIG. 1). By way of example, the message may contain the following fields and values: the message type 702 (FIG. 7) may indicate "InitiateVoiceCommunication," the queue name 704 (FIG. 7) may indicate "Session3252," and the message body 706 (FIG. 7) may instruct the smart client kiosk 112 (FIG. 1) to establish voice communication using the GigaPOP ACD/IVR 624 (FIG. 6). The VERA Messaging Service 506 (FIG. 5) places this message in the queue "Session3252" from which the smart client kiosk 112 (FIG. 1) receives the message. Upon receiving the message, the smart client kiosk 112 (FIG. 1) establishes vocal communication with the agent terminal 126 (FIG. 1) using the GigaPOP ACD/IVR 624 (FIG. 6). The customer 104 (FIG. 1) and agent 102 (FIG. 1) can now speak with each other while the smart client kiosk 112 (FIG. 1) and the agent desktop 126 (FIG. 1) can send messages back and forth using the VERA Messaging Service 506 (FIG. 5) and the "Session3252" queue.

After establishing communication with the customer 104 (FIG. 1), the agent 102 (FIG. 2) uses the agent interface 300 to aid the customer. The agent 102 (FIG. 1) knows that the customer is in a BEST BUY™ by examining the store logo section 316 (FIG. 3) of the agent user interface 300 (FIG. 3). This informs the agent 102 (FIG. 1) that she is acting as a representative of BEST BUY™. The agent 102 (FIG. 2) then follows a script 304 (FIG. 3) to collect information from the customer 104 (FIG. 1), via the phone call established through the GigaPOP ACD/IVR 624 (FIG. 6), and learns that the customer 104 (FIG. 1) is interested in a cell phone with Bluetooth wireless technology and three hours talking time. The agent indicates these features 306 (FIG. 3) on the agent interface 300 (FIG. 3) and initiates a search for products that have these required features. The agent desktop 602 (FIG. 6) or the application server 628 (FIG. 6) applies a set of business rules to the desired features and discovers which products contain these features. The agent desktop 602 (FIG. 6) then retrieves content information about these products from a local datastore 632 (FIG. 6) and displays the information to agent 102 (FIG. 2) using agent interface 300 (FIG. 3).

After the agent 102 (FIG. 1) reviews the content information, she decides what information would be helpful to relay to the customer 104 (FIG. 1). Agent 102 (FIG. 1) indicates what information should be viewed by the customer 104 (FIG. 1) using agent interface 300 (FIG. 3). The agent desktop 602 sends an XML message containing a message in the message body 706 (FIG. 7) to the smart client kiosk 112 (FIG. 1) using the VERA Messaging Service 506 (FIG. 5), which is placed in the "Session3252" queue. The message contains an address for the content information to be displayed on the smart client kiosk 112 (FIG. 1). The smart client kiosk 112 (FIG. 1) retrieves the message from "Session3252" and retrieves the content information from a local datastore, e.g., content cache 606 (FIG. 6) using the address provided in message body 706 (FIG. 7). The smart client kiosk 112 (FIG. 1) then displays the information for the customer 104 (FIG. 1) to review.

At any time during the session, enterprise systems 508 (FIG. 5) or commerce server 634 (FIG. 6) can subscribe to the "Session 3252" queue and retrieve messages sent between the customer 104 (FIG. 1) and the agent 102 (FIG. 1) and store information from the session in their various components. Additionally, manager device 616 (FIG. 6) can subscribe to the "Session3252" queue to monitor the conversation between the agent 102 (FIG. 1) and the customer 104 (FIG. 1).

If the customer 104 (FIG. 1) decides to buy a cell phone, the agent 102 (FIG. 1) can aid the customer in the purchase by using the shopping cart tab 334 (FIG. 3) on the agent interface 300 (FIG. 3). Any additions to the shopping cart are also displayed in the customer's shopping cart 220 (FIG. 2) on the customer user interface 200 (FIG. 2). Once the customer 104 (FIG. 1) no longer needs help, the session can be terminated by the customer 104 (FIG. 1) using customer interface 200 (FIG. 2) or the agent 102 (FIG. 1) using agent interface 300 (FIG. 3). When the session is terminated the agent terminal 126 (FIG. 1) queries queues 512, 514, and/or 516 (FIG. 5) to determine if another customer needs help and if so, initiates another session. The smart client kiosk 112 (FIG. 1) waits for another customer 104 (FIG. 1) to initiate a session.

Embodiments of the invention have the advantage of allowing a retail store to provide expert help to customers without having to worry about the high turnover and costly training of in-store employees. An agent, at a call center, can provide help to multiple retail stores at the same time. This live agent coverage allows retail stores to rely upon a centralized system of expertise rather than having to thoroughly train employees at every single store location.

At least some embodiments have the further advantage of allowing communication between an agent and a customer to take place over a smaller bandwidth. Because the system allows for interaction without co-browsing, the agent and the customer can view different content information. These systems and methods allow the agent to analyze large amounts of information but send only helpful information to the client. Furthermore, the process of sending XML messages instead of content allows for interaction to take place over narrower bandwidth. Additionally, the process of storing content information locally to both the agent and the customer allows for the quick retrieval of content.

This disclosure described some embodiments of the present invention with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

In addition, although the embodiments have been described in language specific to structural features, methodological acts, and computer-readable media containing such acts, it is to be understood that the possible embodiments, as defined in the appended claims, are not necessarily limited to the specific structure, acts, or media described. One skilled in the art will recognize other embodiments or improvements that are within the scope and spirit of the present invention. Therefore, the specific structure, acts, or media are disclosed only as illustrative embodiments. The invention is defined by the appended claims.

What is claimed is:

1. A method for providing product information to a customer interface device located in a retail store from an agent interface device and a datastore, the method comprising:

receiving a message at the customer interface device located in the retail store from the agent interface device, the message directing the customer interface device to retrieve the product information from the datastore; and retrieving product information in the customer interface device located in the retail store from the datastore, wherein the customer interface device displays the retrieved product information and wherein the customer interface device and the agent interface device are not co-browsing but conducting two separately-controlled but linked sessions, and further wherein a user display for the customer interface device and an agent display at the agent interface device display different content about the product information.

2. The method of claim 1, further comprising transmitting a message to the customer interface device from the agent interface device.

3. The method of claim 2, further comprising:
sending a request from the customer interface device to the agent interface device;
applying a set of business rules to the request; and
based upon the set of business rules, matching the request to the product information.

4. The method of claim 1, wherein the message is an XML message.

5. The method of claim 4, wherein the address is a URL.

6. The method of claim 1, wherein the message is an instruction directing the customer interface device to the datastore to retrieve the product information.

7. The method of claim 1, the product information exchanged between the customer interface device and agent interface device further comprises:
transmitting the message from the agent interface device to the customer interface device, the message containing an address to the datastore; and
based upon the address, retrieving the product information from the datastore.

8. The method of claim 1, wherein the customer interface device is a smart client kiosk, a personal digital assistant, a laptop, a wireless computer, a stand-alone kiosk, or a cell phone.

9. The method of claim 1, wherein the agent interface device is a laptop computer, a server computer, a web application, or a remote terminal.

10. The method of claim 1, wherein the datastore is one of a data storage component in the user interface device, a remote data storage component at a server or a web site.

11. The method of claim 1, wherein the product information is information about one of a product rating, a product description, a product price, a product's features, or a product's peripheral devices.

12. The method of claim 1, wherein a portion of the content display of the product information on the user interface and the agent interface is the same.

13. The method of claim 1, wherein the messages are transmitted over a network.

14. A system for providing product information to a customer, the system comprising:
a customer interface device carried around by the customer in a retail store;
an agent interface device capable of communication with the customer interface device, wherein when the customer lingers in one area of the retail store the agent interface device automatically starts a communication session with the customer interface device which receives one or more messages about product information from the agent interface device; and
a datastore containing the product information, the datastore in communication with the customer interface device located in the retail store, wherein the customer interface device retrieves the product information from the datastore based on the one or more messages.

15. The system of claim 14, further comprising the agent interface device in communication with the customer interface device, the agent interface device sending messages to the customer interface device associated with product information.

16. The system of claim 14, further comprising an automation component in communication with the agent interface device and the customer interface device, wherein the automation component provides for automated collection of data and an automated response to messages from the customer interface device.

17. The system of claim 16, wherein the automation component further comprises:
a GiGaPOP ACD/IVR component;
a CTI component; and
an application server.

18. The system of claim 17, further comprising:
an enterprise service bus connection in electrical communication with the customer interface device and the agent interface device for broadcasting messages.

19. The system of claim 14, further comprising:
a web services provider for facilitating communication between the customer interface device and the agent interface device;
a manager device in communication with the web services provider, the manager device monitoring an interaction between the customer interface device and the agent interface device; and
a manager event queue in communication with the manager device, the manager event queue storing messages transmitted between the customer interface device and the agent interface device.

20. The system of claim 14, further comprising:
an agent session manager, wherein the agent session manager monitors the agent interface device; and
an event log in communication with the agent session manager, wherein the event log stores an event created by the agent interface device.

21. The system of claim 20, wherein the commerce server further comprises:
a profile manager, wherein the profile manager stores a set of user information related to the customer;
a content manager, wherein the content manager updates the content cache; and
a commerce component, wherein the commerce component assists with sales.

22. The system of claim 14, further comprising:
a content cache in communication with the customer interface device, wherein the content cache contains content information; and
a commerce server in communication with the content cache.

23. In a computer system having one or more graphical user interfaces including a display and a user interface selection device, a method for an agent providing product knowledge to a customer, the method comprising:
receiving a request from the customer by the user interface selection device of a customer interface device located in a retail store, the request requesting the product knowledge for a product;
in response to the request, messaging the customer interface device located in the retail store to display the product knowledge in the graphical user interface of the customer interface device;
in response to the request, displaying the product knowledge in the graphical user interface of the agent interface device viewed by the agent; and
wherein the customer interface device and the agent interface device are not co-browsing but conducting two separately-controlled but linked sessions, and further wherein the display of the product knowledge in the graphical user interface of the customer interface device located in the retail store is different than the product knowledge in the graphical user interface of the agent interface device.

24. The method of claim 23, wherein receiving a request comprises:
receiving an indication from the customer by the user interface selection device to initiate a communication session with an agent;
displaying, on the display of the customer interface device, that the communication session has been initiated;
displaying queries to the customer; and
receiving responses to the queries from the customer.

25. The method of claim 23, further comprising:
receiving a query from the agent interface device; and
displaying the query from the agent interface device to the customer interface device.

26. The method of claim 23, further comprising:
receiving a message from the agent interface device, wherein the message instructs the user interface of the customer interface device to display a content information associated with the product knowledge; and
displaying on the customer interface device the content information based on the message.

27. The method of claim 23, further comprising:
receiving an indication from the agent to initiate a communication session with the customer;
displaying on the agent interface device that the communication session has been initiated;
receiving responses from the customer interface device;
displaying the responses on the agent interface device; and
based upon the responses, displaying content information associated with the product knowledge on the agent interface device.

28. The method of claim 23, wherein the graphical user interface on the agent interface device displays a portion of the content information associated with the product knowledge the same as the graphical user interface on the customer interface device.

* * * * *